United States Patent
Kaushik et al.

(10) Patent No.: US 10,362,600 B2
(45) Date of Patent: Jul. 23, 2019

(54) EMULATING VIRTUAL PORT CONTROL OF AIRTIME FAIRNESS USING PER STATION ENHANCED DISTRIBUTED CHANNEL ACCESS (EDCA) PARAMETERS

(71) Applicant: Fortinet, Inc., Sunnyvale, CA (US)

(72) Inventors: Anil Kaushik, Bangalore (IN); Saurabh Bhargava, San Jose, CA (US); Siva Rama Krishna Rao Yogendra Jupudi, Bangalore (IN); Sachin P. Dohre, Gujarat (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/435,104

(22) Filed: Feb. 16, 2017

(65) Prior Publication Data

US 2017/0188384 A1   Jun. 29, 2017

Related U.S. Application Data

(63) Continuation of application No. 14/504,394, filed on Oct. 1, 2014, now Pat. No. 9,622,263.

(51) Int. Cl.
*H04W 24/08* (2009.01)
*H04W 36/00* (2009.01)
*H04W 36/08* (2009.01)
*H04W 48/12* (2009.01)
*H04W 48/14* (2009.01)
(Continued)

(52) U.S. Cl.
CPC ......... *H04W 74/004* (2013.01); *H04W 24/08* (2013.01); *H04W 36/0055* (2013.01); *H04W 36/08* (2013.01); *H04W 48/12* (2013.01); *H04W 48/14* (2013.01); *H04W 74/008* (2013.01); *H04W 76/11* (2018.02); *H04W 84/12* (2013.01)

(58) Field of Classification Search
CPC ...... H04L 69/24; H04W 72/12; H04W 72/04; H04W 74/00; H04W 48/12; H04W 48/14
See application file for complete search history.

(56) References Cited

U.S. PATENT DOCUMENTS

| | | | | |
|---|---|---|---|---|
| 7,724,713 B2* | 5/2010 | Del Prado Pavon | | H04W 48/08 370/338 |
| 8,305,885 B2* | 11/2012 | Ji | | H04W 74/0816 370/229 |
| 8,483,105 B2* | 7/2013 | Nanda et al. | | 370/278 |

* cited by examiner

*Primary Examiner* — Ayaz R Sheikh
*Assistant Examiner* — Debebe A Asefa
(74) *Attorney, Agent, or Firm* — Law Office of Dorian Cartwright; Dorian Cartwright

(57) ABSTRACT

A technique for emulating virtual port control of airtime fairness for wireless stations using per station Enhanced Distributed Channel Access (EDCA) parameters. Specific parameters are received for each of a plurality of stations connected to the access point. An EDCA field of a beacon that stores a general EDCA parameter is set to an empty state. The beacon is broadcast to a plurality stations on the wireless communication network and within range of an access point. The beacon comprises a BSSID (Basic Service Set Identifier) for use by the plurality of stations to connect with the access point for access to the wireless communication network. The beacon also comprises an empty EDCA field. In response to broadcasting the empty EDCA parameter, receiving a direct inquiry from each of the plurality of stations for the general EDCA parameter. Each of the plurality of stations is responded to with a direct communication of a specific parameter corresponding to each station. A transmission is received from at least one of the stations complying with the specific parameter.

17 Claims, 7 Drawing Sheets

(51) Int. Cl.
*H04W 74/00* (2009.01)
*H04W 76/11* (2018.01)
*H04W 84/12* (2009.01)

EMULATING VIRTUAL PORT CONTROL OF AIRTIME FAIRNESS USING PER STATION ENHANCED DISTRIBUTED CHANNEL ACCESS (EDCA) PARAMETERS

RELATED APPLICATION DATA

This application is a continuation of U.S. patent application Ser. No. 14/504,394 filed Oct. 1, 2014, entitled Emulating Virtual Port Control of Airtime Fairness Using Per Station Enhanced Distributed Channel Access (EDCA) Parameters by Anil Kaushik et al., the content of which is incorporated herein by reference in its entirety.

FIELD OF THE INVENTION

The invention relates generally to wireless computer networking, and more specifically, to emulating virtual port control of airtime fairness for wireless stations using per station Enhanced Distributed Channel Access (EDCA) parameters.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in stations such as laptop computers, tablet computers, smart phones, and network appliances.

Stations complying with standards such as IEEE 802.11 have control over how a connection to wireless network is made. Namely, a station selects an access point among a number of access points that have sent out beacons advertising a presence. The beacon includes a BSSID (Basic Service Set Identifier) as an identifier of the access point. In turn, the station transmits data packets which include the BSSID of the intended access point. Unintended access points receiving a transmission merely ignore the data packets.

Problematically, stations also inherently have control over uplink accesses to wireless networks. Uplink access is necessary for sending data to the wireless network from a station, such as URL requests, queries, control information, and the like. Although an access point can control an amount of data over downlink accesses, there is no control built into the protocol for uplink accesses of, for example, aggressive stations. Consequentially, a station can consume more than a fair amount of bandwidth on a network, or overburden a processing load of network components. This problem is exasperated for public hot spots or large companies that have a large amount of stations connected at the same time. For example, the number of collisions can degrade channel quality when too many stations uplink at the same time.

One technique to address this issue is to download customized software to a station. But reconfiguration of stations running on a station is not always desirable. For instance, guests connecting to a public hot spot for only one time would be burdened with the process of downloading and installing a client. Furthermore, many computer users are weary about malicious applications downloaded from the Internet.

Another technique to address this issue, known as virtual port, assigns a BSSID to each station in order to set uplink parameters. Unfortunately, the overhead of virtual port is prohibitive for scaling because regular beacons are sent out for each BSSID to maintain synchronization with an access point. In larger deployments, the occurrence of still beacons increase as the requirement for individual beacons required over each period cannot be met. Consequentially, degradation of station connectivity can occur at, for instance, when 20 or more wireless stations are connected to the access point.

What is needed is a robust technique to provide airtime fairness and uplink access control for connected stations. Further, the uplink access control should be extendable to a per-station level. Finally, the technique should not require reconfiguration of a standard IEEE 802.11 station.

SUMMARY

These shortcomings are addressed by the present disclosure of methods, computer program products, and systems for emulating virtual port control of airtime fairness for wireless stations using per station Enhanced Distributed Channel Access (EDCA) parameters. Direct communication of parameters for airtime fairness can be sent individually to stations by intentionally disrupting broadcast communication of parameters through beacons.

In an embodiment, a specific parameter for each of a plurality of stations connected to the access point is received. An EDCA field of a beacon that stores a general EDCA parameter is set to an empty state. The beacon also comprises a BSSID (Basic Service Set Identifier) for use by the plurality of stations to connect with the access point for access to the wireless communication network. The beacon is broadcast to a plurality stations on the wireless communication network and within range of an access point.

In one embodiment, in response to broadcasting the empty EDCA parameter, a direct inquiry is received from each of the plurality of stations for the general EDCA parameter. Each of the plurality of stations is responded to with a direct communication of a specific parameter corresponding to each station. A transmission is received from at least one of the plurality of stations that complies with the respective specific parameter.

Advantageously, virtual port control of airtime fairness is achieved without the overhead of multiple beacons.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for emulating virtual port control of airtime fairness for wireless stations using per station Enhanced Distributed Channel Access (EDCA) parameters. Direct communication of parameters for airtime fairness to each station can be enabled by intentionally disrupting broadcast communication of parameters through beacons. Although EDCA parameters (generally referred to simply as "parameters") are primarily discussed herein, the same principle can be applied to other fields of a beacon frame. Additionally, one of ordinary skill in the art will recognize that many other scenarios are possible, as discussed in more detail below.

Systems to Emulate Virtual Port for Airtime Fairness (FIGS. 1-4)

Figure 1:
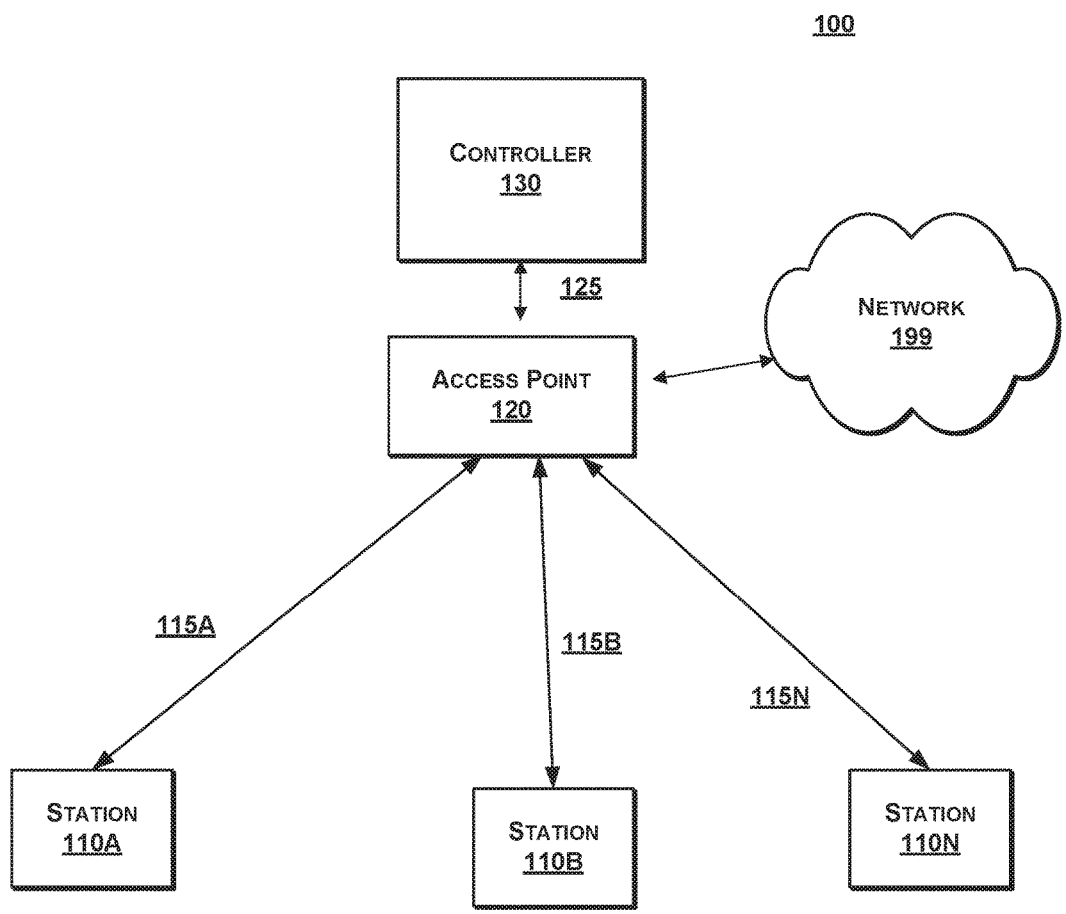
FIG. 1 is a high-level block diagram illustrating a system to emulate virtual port for airtime fairness, according to one embodiment.

FIG. 1 is a high-level block diagram illustrating a system 100 to emulate virtual port for airtime fairness, according to one embodiment. The system 100 comprises stations 110A-N, an access point 120, and a controller 130. The components can be coupled to a network 199, such as the Internet, a local network or a cellular network, through any suitable wired (e.g., Ethernet) or wireless (e.g., Wi-Fi or 4G) medium, or combination. In a preferred embodiment, the stations 110A-N are coupled to the access point 120 through a wireless communication channel 115A-N while the access point 120 can be coupled to the controller 130 through a wired network 125. Other embodiments of communication channels are possible, including a cloud-based controller, and hybrid networks. Additional network components can also be part of the system 100, such as firewalls, virus scanners, routers, switches, application servers, databases, and the like. In general, the stations 110A-N use communication channels 115A-N for uplink (and downlink) access.

Figure 8:
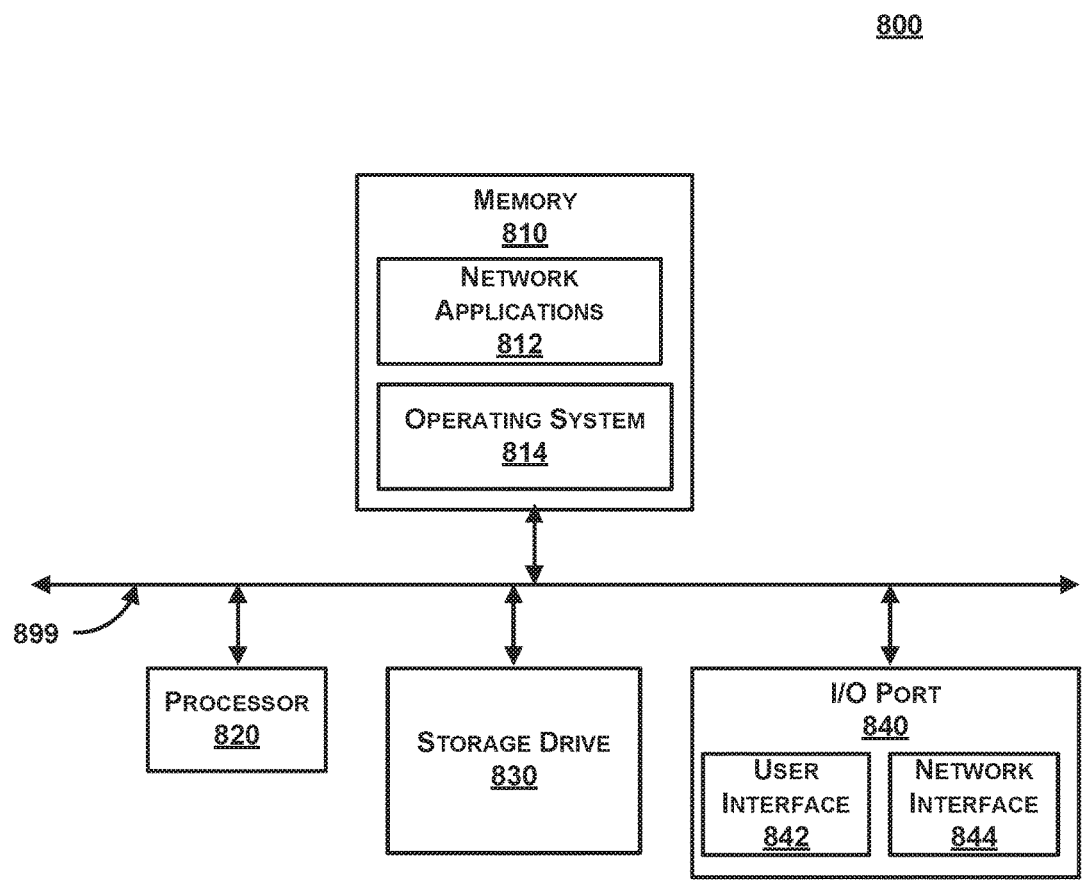
FIG. 8 is a block diagram illustrating an exemplary computing device, according to one embodiment.

The stations 110A-N can be, for example, a personal computer, a laptop computer, a tablet computer, a smart phone, a mobile computing device, a server, a cloud-based device, a virtual device, an Internet appliance, or the like (e.g., see FIG. 8). No special client is needed for this particular technique, although other aspects of the network may require downloads to the stations 110A-N. The stations 110A-N connect to the access point 120 for access to, for example, a LAN or external networks. In one embodiment, a child plays video games on a wireless game console in communication with streaming applications from a cloud-based application server. In a different embodiment, an employee authenticates over a secure channel of an enterprise network to modify remotely stored secure files. In another embodiment, a guest at a coffee shop accesses a public hot spot to watch stream videos stored on a public web site. Using the current technique, the stations 110A-N receive channel access parameters from the EDCA parameters of beacons broadcast to all connected stations 110A-N. When a beacon has an empty EDCA field, the stations 110A-N request and receive the information from the access point 120 through a direct point-to-point communication (although not necessarily for each beacon).

Figure 6:
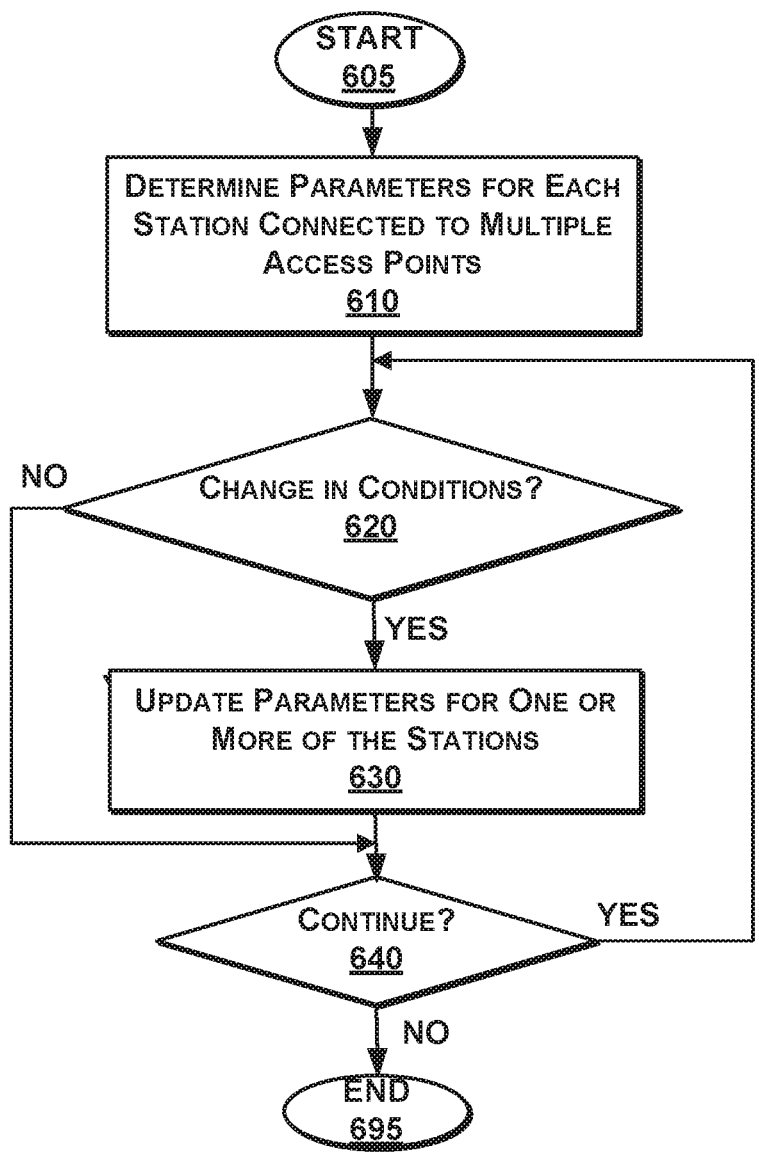
FIG. 6 is a flow diagram illustrating a method for emulating virtual port from a controller of the system, according to one embodiment.

The access point 120 includes one or more individual access points and comprises any of the computing devices discussed herein (e.g., see FIG. 6). For example, the access points 120A-C can be an AP 110 or AP 433 (modified as discussed herein) by Meru Networks of Sunnyvale, Calif. The access point 120 is coupled with stations 110A-N for exchanging frames with other network resources. The access point 120 can be set-up in various configurations to provide wireless coverage areas. The access point 120 can, in turn, be connected to a wired hub, switch or router connected to the network 199. In another embodiment, the functionality is incorporated into a switch or router. Additional access points can be included in the system 100. Further, some of the access points can share the same BSSID to provide seamless mobility, or a virtual cell, as stations move from range of one to another without having to reconfigure to a new BSSID. Some access points can host virtual ports in which an individual station has a dedicated BSSID that is unique in the system 100 and persists after hand-offs to a different access point.

Figure 7:
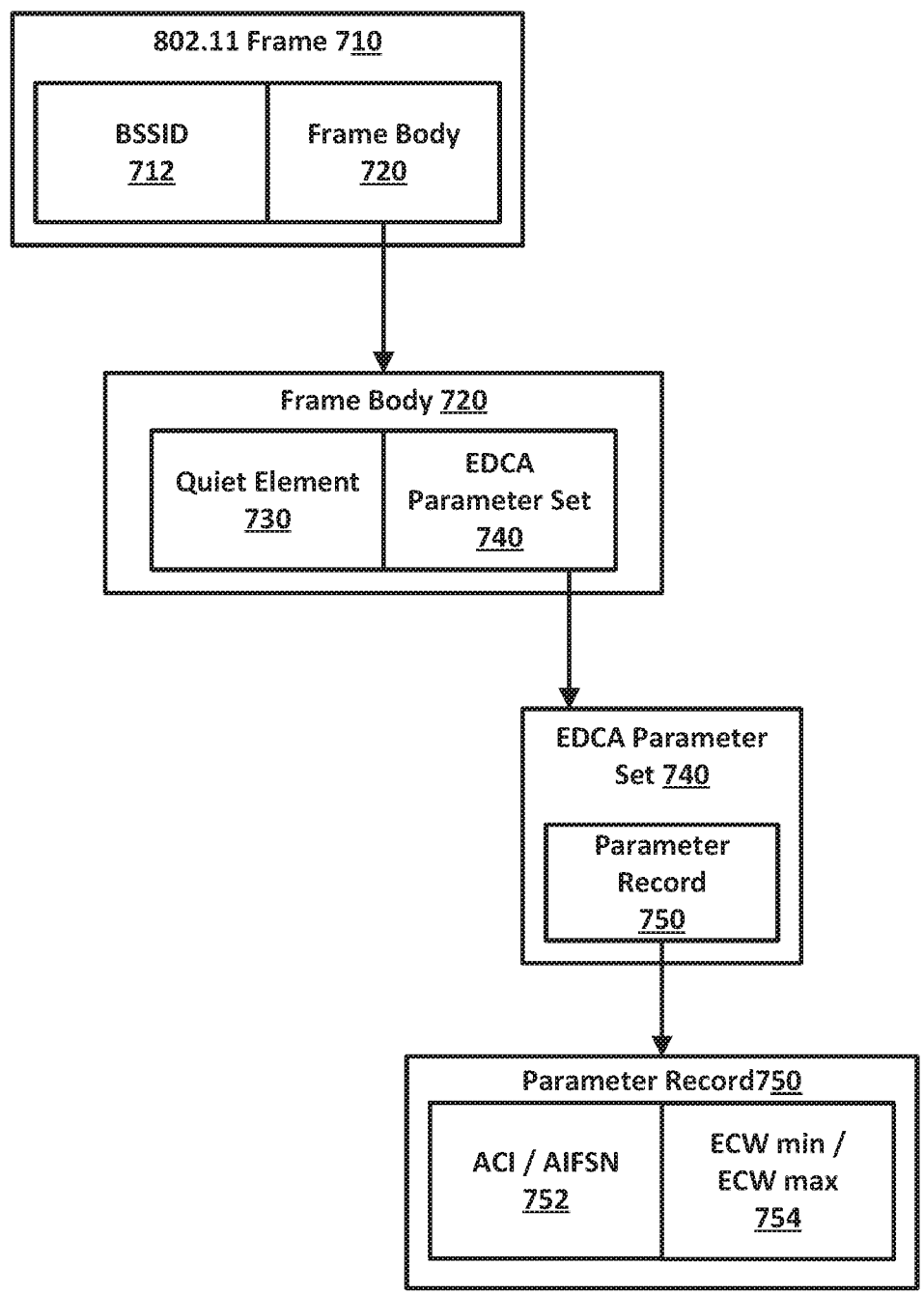
FIG. 7 is a schematic diagram illustrating an exemplary IEEE 802.11 network packet with an Enhanced Distributed Channel Access (EDCA) field having an empty state, according to one embodiment.

To implement airtime fairness among the stations 110A-C, the access point 120 modifies one or more fields in beacons (or probe responses), including at least one EDCA parameter (see exemplary EDCA field in FIG. 7). In one embodiment, the access point 120 generates and broadcasts an empty EDCA field within a beacon periodically sent to connected stations, contrary to procedures IEEE 802.11, for instance. In turn, the access point 120 receives a direct request from each of the connected stations 110A-N for an EDCA value. At this point, the access point 120 refers to a look-up table for one or more parameters related to channel access that stores parameters for each station, and sends information direction to each of the stations. The look-up table can be stored locally (e.g., cached) or remotely and be updated automatically or manually. For example, a quality of service class can be set based on a type of data transmission such as voice, video, best effort, or background. In this manner, the access point 120 is able to provide virtual port control of airtime fairness without the overhead of assigning a separate BSSID for each station. In some embodiments, however, the access point 120 can use more than one BSSID, but as long as there are fewer BSSIDs than stations, the present technique can be advantageous. In one example, a BSSID is a 48-bit field of the same format as an IEEE 802 MAC address that uniquely identifies a BSS (Blind Service Set). Per station parameters can be toggled on and off for the access point 120 (e.g., responsive to a detected condition such as traffic), and an on/off state can vary between access points. In some embodiments, all beacons need not have an empty field and all stations need not receive direct EDCA parameters.

Algorithms to initially set parameters, to adjust the parameters, and to determine which access point provides the parameters are all implementation-specific. In one example, the access point 120 discriminates access for particular users or groups of users (e.g., CEO, network administrator, authenticated user, guest, suspicious station, etc.), for particular types of computers (e.g., critical data server, rarely-accessed archival data storage, etc.), for particular types of traffic (streaming HD (high-definition) video, low bandwidth video, secure data, voice, best effort, background, etc.), and the like. Initial default parameters can be uniform and adjusted once the access point 120 gathers more information about a particular station such as traffic patterns. For instance, over use by a particular station can be controlled, and under use by a particular station can allow bandwidth to be reserved for other resources, both with constricting EDCA parameters. In another instance, a high-priority station can be awarded with additional bandwidth with more liberal EDCA parameters. More detailed embodiments of the access point 120 are set forth below in FIG. 2.

The controller 130 can be implemented in any of the computing devices discussed herein (e.g., see FIG. 6). For example, the controller 130 can be an MC1500 or MC6000 device (modified as discussed herein) by Meru Networks of Sunnyvale, Calif. In operation, the controller 130 communicates with the access point 120 (and other access points) to direct parameters for each of the stations 110A-N. Moreover, the controller 130 determines, in one embodiment, which access point of many should communicate with a particular one of the stations 110A-N, among other things. The controller 130 can also solely or jointly determine parameters for each station. In one example, the controller 130 varies the parameters based on a top-level network view of traffic and congestion (i.e., provide less access during heavy traffic and more during light traffic). The controller 130 can also track the stations 110A-N through connections to different access points and enforce the same parameters after hand-offs. Additional embodiments of the controller 130 are discussed below with respect to FIG. 3.

Figure 2:
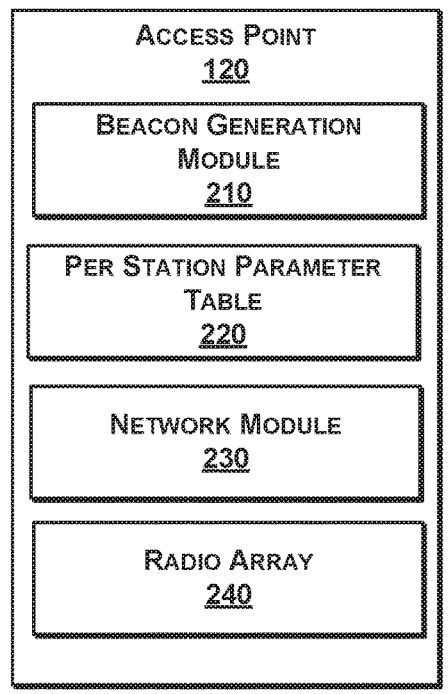
FIG. 2 is a more detailed block diagram illustrating an access point of the system of FIG. 1, according to one embodiment.

FIG. 2 is a more detailed block diagram illustrating an access point 120 of the system 100, according to one embodiment. The access point 120 comprises a beacon generation module 210, a per station parameter table 220, a network module 230, and a radio array 240. The components can be implemented in hardware, software, or a combination of both.

The beacon generation module 210 generates beacons with empty EDCA parameter values and BSSIDs. The per station parameter table 220 stores globally and/or locally-influenced parameter values, policy-based parameter values, manually configured parameter values, and the like. Parameter values for historical and predictive stations can be stored in one option. For example, a look-up table can map each MAC (media access control) address of stations to corresponding parameter values. The network module 230 can manage higher-level network communications with other external resources. The radio array 240 represents RF (radio frequency) hardware necessary for physical channel access.

Figure 3:
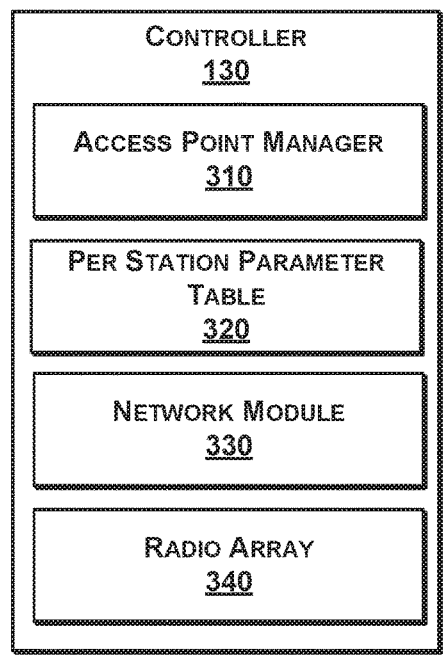
FIG. 3 is a more detailed block diagram illustrating a controller of the system of FIG. 1, according to one embodiment.

FIG. 3 is a more detailed block diagram illustrating a controller 130 of the system 100, according to one embodiment. The controller 130 comprises an access point manager 310, a per station parameter table 320, a network module 330, and a radio array 340. The components can be implemented in hardware, software, or a combination of both.

The access point manager 310 logs and directs activities of access points under the controller 130. For example, BSSID assignments are issued, and stations connected to a particular BSSID are monitored. The per station parameter table 320 can determine globally-influenced parameter values, policy-based parameter values, manually configured parameter values, or the like, in a look-up table or database. The network module 330 and the radio array 340 can all be similar to the components of the access point 120 of FIG. 2.

Figure 4:
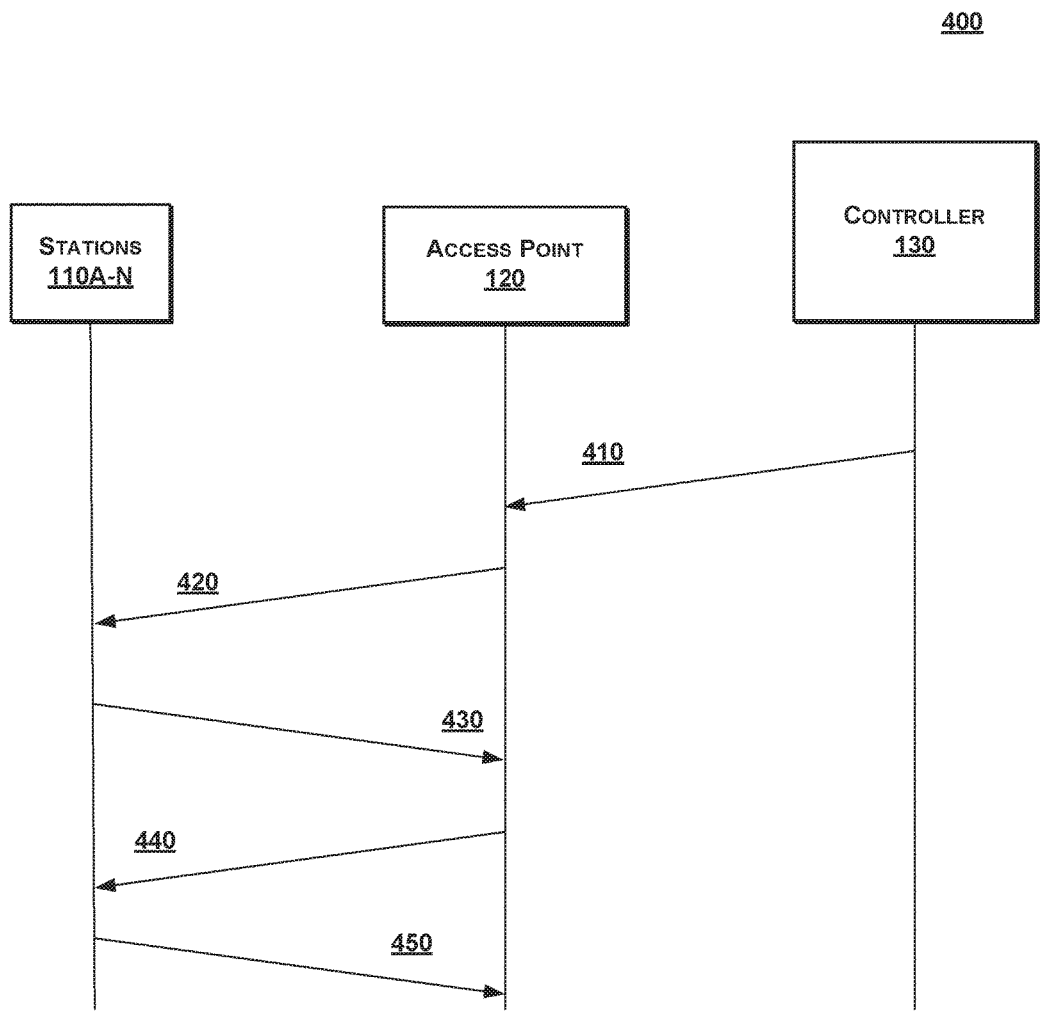
FIG. 4 is a sequence diagram illustrating interactions between components of the system of FIG. 1, according to one embodiment.
Figure 5:
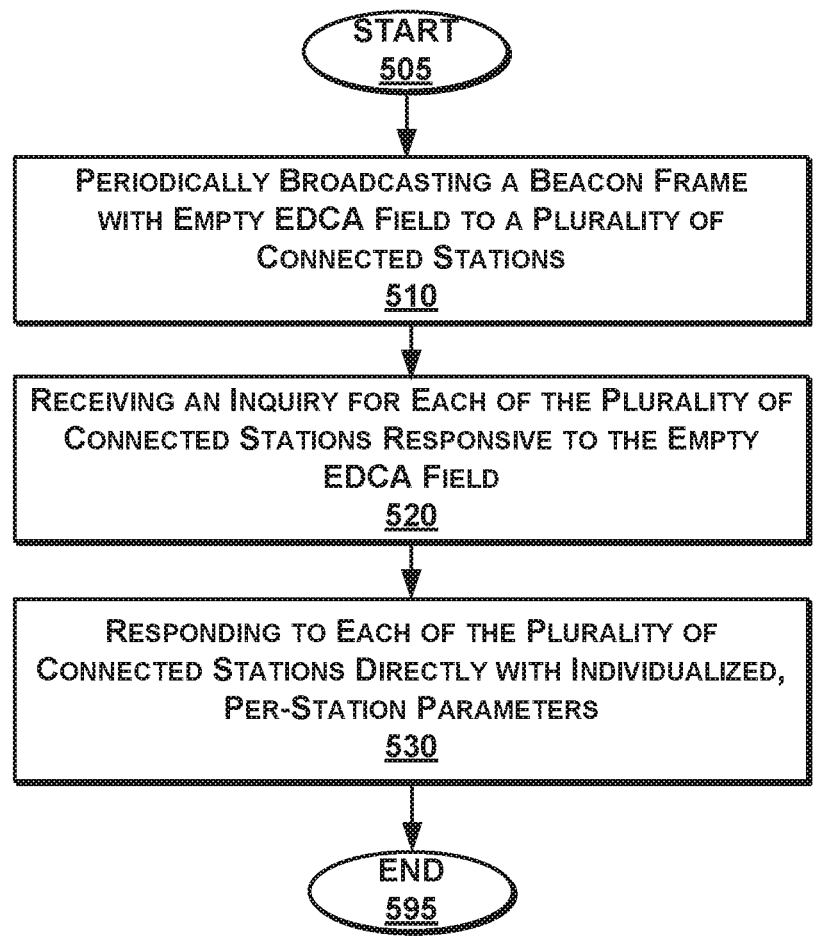
FIG. 5 is a flow diagram illustrating a method for emulating virtual port from an access point of the system, according to one embodiment.

FIG. 4 is a sequence diagram illustrating interactions 400 between components of the system 100 of FIG. 1 to control uplink access, according to one embodiment. The interactions represent wireless communications with in accordance with IEEE 802.11 standards, to the like. An example of an 802.11 network packet configured for implementation herein is illustrated in FIG. 7. In between the interactions, methods performed within the components of FIG. 4 are illustrated in FIGS. 5 and 6. The illustrated interactions 400 of FIG. 4 are not intended to be limiting. As such, the interactions 410 to 450 can be a portion of steps from a longer process.

Initially, at interaction 410, the controller 130 sends parameters to the access point 120, including per station airtime fairness data such as a parameter record, an AIFS (arbitration and inter-frame space) value or a CW (contention window) value (i.e., exponent form of CW min or exponent form of ECW max value). Controller-provided parameters are just one possible implementation, as discussed previously. At interaction 420 the access point 120 sends periodic beacon, with an empty EDCA field, over a respective coverage area to the stations 110A-N. At interaction 430, the stations 110A-N sends a request to the access point 120, responsive to the empty EDCA field. If controller-provided parameters have yet to be provided, the access point 120 can make a request to the controller 130 at this point. At step 440, the access point 120 returns individualized parameters to each of the stations 110A-N. Finally, at step 450, one or more of the stations 110A-N transmit to the access point 120 in accordance with the parameters.

Methods for Emulating Virtual Port for Airtime Fairness (FIG. 5-7)

FIG. 5 is a block diagram illustrating a method 500 for emulating virtual port for airtime fairness from an access point (e.g., the access point 120 of FIG. 1), according to one embodiment.

The process starts 505 and at step 510, when a beacon frame with an empty EDCA field is periodically broadcast to a plurality of stations (e.g., the stations 110A-N of FIG. 1). A beacon frame is generated by access points to initially connect stations and to maintain connections as well. Alternatively, a probe response to can be modified. The current technique deviates from protocols such as IEEE 802.11 by intentionally disrupting communication of EDCA parameter values, even when communication of such is possible.

At step 520, an inquiry is received for each of the plurality of connected stations in response to the empty EDCA field. Under some IEEE 802.11 protocols, stations are expecting EDCA field values in the beacon. The protocols could assume that most stations received EDCA values correctly and only stations that do not receive the beacon should send a direct message to an access point for retransmission of that particular parameter back to the station rather than all stations. In some embodiments, a station continues to use previous values when empty EDCA parameters are received. The request can be sent out immediately and each time a beacon with missing values is received, or in some cases, after a preconfigured number of allegedly defective beacons are received.

At step 530, each of the plurality of connected station is responded to with individualized, per-station parameters. A look-up table stored on an access point, a controller, or elsewhere, is consulted responsive to the station requests. A fast memory or processor cache can be reserved for faster responses, in some embodiments. The parameter values can be manually or automatically populated. Policies can enable automated determination of parameter values. In one embodiment, the per station parameter value is sent back directly to a requesting station. As a result, subsequent data transmissions from a station comply with per station parameter values. The process ends 595, for example, when an access point is taken offline or when a station is handed off to a different access point.

FIG. 6 is a block diagram illustrating a method 600 for emulating virtual port for airtime fairness in a controller (e.g., the controller 130 of FIG. 1), according to one embodiment.

The process starts 605 at step 610, when parameters for each station connected to multiple access points are determined (e.g., by an access point, by a controller, or manually configured). In one aspect, parameter determined by a controller can be global parameters that are taking into consideration with local parameters from an access point serving a station. In another aspect, global parameters can overrule local parameters. Parameters can also be responsive to active profiling of a station, connection history, neighbor interference and other factors discussed herein explicitly and that would be known to one of ordinary skill in the art.

At step 620, in response to a change in conditions, parameters are updated for one or more of the stations at step 630. For example, an imbalance in traffic load among access points, excessive downtime for an access point, a change in uplink access for a station, start or end of business hours, and other factors can each result in updates to parameter values. Additionally, a change detected at one station can cause EDCA parameters to be updated at a different station connected to a different access point across the network. Some changes in condition result in no changes to parameters. The update process can continue until ended 695 when the station disconnects from a communication network, for instance.

FIG. 7 is a schematic diagram illustrating an exemplary IEEE 802.11 network data packet 700 with embedded uplink control configurations, according to one embodiment. The data packet 700 includes several fields in a MAC (media access control) header, including a BSSID 712 and a Frame Body 720 fields. Other fields within the data packet 700 can include Frame Control, Duration, Address 1, Source Address, Destination Address, Sequence Control, and HT (high throughput) Control.

The BSSID 712 field identifies a particular access point. The Frame Body 720 for a beacon frame includes a Quiet Element 730 and an EDCA Parameter Set 740 which can be employed herein for uplink medium access control. Other fields with in the Frame Body 720 can include Timestamp, Beacon interval, Capability, Service Set Identifier (SSID), Supported rates, Frequency-Hopping (FH) Parameter Set, and Direct Sequence (DS) Parameter Set.

The EDCA Parameter Set 740 includes a Parameter Record 750. Within the Parameter Record 750, a CW (contention window) 754 and an AIFS 752 are shortened for high priority packets. In another instance, the AIFS 752 and the eCWmin 754 in a beacon are set to a value higher than the default values (suggested values are, e.g., AIFS=15 and eCWmin=9).

According to some IEEE 802.11 standards, EDCA provides a probabilistic-based, quality of service by grouping traffic into four access classes: voice, video, beset effort and background in respective order of priority. Frames are passed to the MAC layer from upper protocol layers with a priority value set between 0 and 7, which are used for mapping into one of the four access classes. Each class can have a separate transmission queue and medium access parameters. The values of AIFS 752, CW 754 and others ensure priority to the medium.

Generic Computing Device (FIG. 8)

FIG. 8 is a block diagram illustrating an exemplary computing device 800 for use in the system 100 of FIG. 1, according to one embodiment. The computing device 800 is an exemplary device that is implementable for each of the components of the system 100, including the stations 110A-N, the access point 120, and the controller 130.

The computing device 800, of the present embodiment, includes a memory 810, a processor 820, a storage device 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include the modules of network applications or access points as illustrated in FIGS. 2 and 3. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 810 or the storage device 830

The storage device 830 can be any non-volatile type of storage such as a magnetic disc, electrically erasable programmable read-only memory (EEPROM), Flash, or the like. The storage device 830 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point of a plurality of access points for controlling a specific level of uplink medium access of a specific wireless station connected to a wireless communication network and to continue the control as the stations move among the plurality of access points, comprising:
   receiving a specific parameter for each of a plurality of stations connected to the access point, including receiving, from a controller that manages controller plurality of access points including the access point, the specific parameter for each of a plurality of stations connected to the access point, wherein the specific parameter is influenced by a network-wide condition of local traffic or congestion across the plurality of access points on the wireless communication network;
   setting an EDCA (Enhanced Distributed Channel Access) field of a beacon that stores a general EDCA parameter to an empty state configured to trigger individual requests for an EDCA parameter from each station to the access point;
   broadcasting the beacon to a plurality stations on the wireless communication network and within range of an access point, the beacon comprising a BSSID (Basic Service Set Identifier) for use by the plurality of stations to connect with the access point for access to the wireless communication network, wherein the beacon also comprises the empty EDCA field;
   receiving a direct inquiry from each of the plurality of stations for the general EDCA parameter for each of the one or more broadcasts, wherein the empty state triggers the direct inquiry by each of the plurality of stations;
   responding to each of the plurality of stations with a direct communication of a specific parameter corresponding to each station; and
   receiving a transmission from at least one of the plurality of stations that complies with the respective specific parameter.

2. The method of claim 1, further comprising:
   determining, at an access point, a specific parameter for each of a plurality of stations connected to the access point.

3. The method of claim 1, further comprising:
   receiving, from a controller that manages a plurality of access points including the access point, a specific parameter for each of a plurality of stations connected to the access point that remain when one or more of the plurality if access stations is handed-off from the access point to a second access point.

4. The method of claim 1, wherein the per station parameter comprises at least one of:
   a parameter record, an AIFS value, and a CW value.

5. The method of claim 1, wherein the per station parameter is set to one of:
   voice traffic, video traffic, best effort traffic and background traffic.

6. The method of claim 1, further comprising:
   detecting a change in network conditions; and
   updating one or more of the per station parameters responsive to the changed network condition.

7. The method of claim 1, wherein the wireless network comprises an IEEE 802.11 type of network.

8. The method of claim 1, further comprising:
   detecting a condition;
   toggling to a first mode in which per station parameters enabled, from a second mode in which per station parameters are not enabled.

9. A non-transitory computer-readable medium storing code that, when executed by a processor, performs a method in access points for controlling uplink medium access of wireless stations connected to a wireless communication network, comprising:
   receiving a specific parameter for each of a plurality of stations connected to the access point, including receiving, from a controller that manages a plurality of access points including the access point, the specific parameter for each of a plurality of stations connected to the access point, wherein the specific parameter is influenced by a network-wide condition of local traffic or congestion across the plurality of access points on the wireless communication network;
   setting an EDCA (Enhanced Distributed Channel Access) field of a beacon that stores a general EDCA parameter to an empty state;
   broadcasting the beacon to a plurality stations on the wireless communication network and within range of an access point, the beacon comprising a BSSID (Basic Service Set Identifier) for use by the plurality of stations to connect with the access point for access to the wireless communication network, wherein the beacon also comprises the empty EDCA field;
   receiving a direct inquiry from each of the plurality of stations for the general EDCA parameter for each of the one or more broadcasts;
   responding to each of the plurality of stations with a direct communication of a specific parameter corresponding to each station; and receiving a transmission from at least one of the plurality of stations that complies with the respective specific parameter.

10. The computer-readable medium of claim 9, wherein the method further comprises:
   determining, at an access point, a specific parameter for each of a plurality of stations connected to the access point.

11. The computer-readable medium of claim 9, wherein the method further comprises:
   receiving, from a controller that manages a plurality of access points including the access point, a specific parameter for each of a plurality of stations connected to the access point that remain when one or more of the plurality if access stations is handed-off from the access point to a second access point.

12. The computer-readable medium of claim 9, wherein the per station parameter comprises at least one of:
   a parameter record, an AIFS value, and a CW value.

13. The computer-readable medium of claim 9, wherein the per station parameter is set to one of:
   voice traffic, video traffic, best effort traffic and background traffic.

14. The computer-readable medium of claim 9, wherein the method further comprises:
   detecting a change in network conditions; and
   updating one or more of the per station parameters responsive to the changed network condition.

15. The computer-readable medium of claim 9, wherein the wireless network comprises an IEEE 802.11 type of network.

16. The computer-readable medium of claim 9, wherein the method further comprises:
   detecting a condition;
   toggling to a first mode in which per station parameters enabled, from a second mode in which per station parameters are not enabled.

17. An access point to control uplink device access to a wireless network, the access point comprising:
   a processor; and
   a memory coupled to the processor and comprising:
      a first module to receive a specific parameter for each of a plurality of stations connected to the access point, including receiving, from a controller that manages a plurality of access points including the access point, the specific parameter for each of a plurality of stations connected to the access point, wherein the specific parameter is influenced by a network-wide condition of local traffic or congestion across the plurality of access points on the wireless communication network;
      a second module to set an EDCA (Enhanced Distributed Channel Access) field of a beacon that stores a general EDCA parameter to an empty state;
      a third module to broadcast the beacon to a plurality stations on the wireless communication network and within range of an access point, the beacon comprising a BSSID (Basic Service Set Identifier) for use by the plurality of stations to connect with the access point for access to the wireless communication network, wherein the beacon also comprises the empty EDCA field;
      a fourth module to, receive a direct inquiry from each of the plurality of stations for the general EDCA parameter for each of the one or more broadcasts;
      a fifth module to respond to each of the plurality of stations with a direct communication of a specific parameter corresponding to each station; and
      a sixth module to receive a transmission from at least one of the plurality of stations that complies with the respective specific parameter.

* * * * *